(12) United States Patent
Tsengas et al.

(10) Patent No.: US 8,256,193 B1
(45) Date of Patent: Sep. 4, 2012

(54) PET PAD STORAGE AND DISPENSE SYSTEM

(75) Inventors: Steven Tsengas, Fairport Harbor, OH (US); Gerald Sciarini, Fairport Harbor, OH (US); Konstantine S. Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 0 days.

(21) Appl. No.: 13/108,237

(22) Filed: May 16, 2011

Related U.S. Application Data

(63) Continuation of application No. 12/604,619, filed on Oct. 23, 2009, now abandoned.

(60) Provisional application No. 61/108,205, filed on Oct. 24, 2008.

(51) Int. Cl.
*B65B 5/02* (2006.01)

(52) U.S. Cl. ............... 53/447; 53/467; 53/473; 206/440; 206/299; 206/745

(58) Field of Classification Search .............. 53/447, 53/467, 473; 206/440, 449, 450, 299, 425, 206/232–233, 745, 494; 119/172, 169, 174
See application file for complete search history.

(56) References Cited

U.S. PATENT DOCUMENTS

| | | | | |
|---|---|---|---|---|
| 1,824,491 A | * | 9/1931 | Molins | 206/273 |
| 2,046,484 A | * | 7/1936 | Ringler | 206/256 |
| 2,095,788 A | * | 10/1937 | Brown | 206/440 |
| 3,746,152 A | * | 7/1973 | Allen | 206/299 |
| 3,884,013 A | * | 5/1975 | Solomon | 53/467 |
| 4,294,353 A | * | 10/1981 | Focke et al. | 206/273 |
| 4,515,270 A | * | 5/1985 | Alvarado | 206/438 |
| 5,044,494 A | * | 9/1991 | Tamura | 206/299 |
| 5,174,443 A | * | 12/1992 | Chance et al. | 206/256 |
| 5,871,142 A | * | 2/1999 | Josephson | 229/120.09 |

* cited by examiner

*Primary Examiner* — Hemant M Desai
(74) *Attorney, Agent, or Firm* — John D. Gugliotta, Esq.

(57) ABSTRACT

A pet pad storage system having an open frame body having a bottom wall and four sidewalls extending upwards therefrom. One pair of sidewalls, opposite each other, terminates slightly before a centerline that runs across their length; hence, no sidewall extends upwards at a center portion of the bottom layer for two of the four edges. A length of strip runs across the inside edge at a top of the remaining pair of sidewalls. In this manner, a stack of sheets can be laid across the interior portion of the frame body. Two perforated edges run across a length of the bottom wall where the sidewalls terminate. A third perforated edge runs across the centerline between the other two. The outer sidewalls of the frame are pulled upwards towards one another to fold the frame member closed. The sheet is rollably folded therein so that the storage system can stand upright in a closet space.

5 Claims, 2 Drawing Sheets

PET PAD STORAGE AND DISPENSE SYSTEM

RELATED APPLICATIONS

The present invention is a Continuation of U.S. Ser. No. 12/604,619 filed on Oct. 23, 2009, now abandoned and claims benefit of U.S. Provisional Application Ser. No. 61/108,205, filed on Oct. 24, 2008 and incorporated by reference as if fully rewritten herein.

BACKGROUND OF THE INVENTION

1. Field of the Invention

The present invention relates to a storage system for puppy training pads and, more specifically, to a foldable storage and dispenser system for stacked absorbent sheets.

2. Description of the Related Art

Pet waste pads were developed as training pads to housebreak puppies not yet in control of their bladders. A convenience of these puppy pads promulgated their use as indoor "toilets" for smaller breeds, s.a., Chihuahuas, Pomeranians and certain terriers. Their popularity furthermore causes them to be relied on as stay-at-home doggy pads for even large breeds. There are a plurality of patents which define structures subsequently developed to retain these waste pads while they are laid across flooring; however, there is no known storage and dispense system designed to minimize the space consumed by rather large, stacked sheets while they are stored.

Pet pads oftentimes measure approximately 23×23 inches while oversized pads can measure as much as 30×30 inches. Most absorbent sheets are purchased twice folded-in-half in a disposable, plastic wrapping. Spent pads are routinely replaced throughout the day with unsoiled ones. The user must pull replacement sheets from a packed stack, unfold them, place them on the flooring to be protected, and then press their fold creases to maintain them. Oftentimes, to hold down the pad to the frame, a tape is used to secure the pad to the floor and to prevent the pad's movement by the dog.

The present invention eliminates steps required to unfold sheets by providing a means to store pet pads completely unfolded; yet, the present invention also provides a pad dispensing storage and use system having a means to compact the absorbent pad sheets so they do not consume the much needed utility space in the storage area. The present invention further provides a means to secure pads in a given location, to minimize run-off of waste, and to maintain a neat appearance.

SUMMARY OF THE INVENTION

It is an object of the present invention to provide a novel system to store sheets of absorbent pet training pads.

It is an object to provide a storage and a dispensing system that is convenient and is easy to use.

It is an object to provide a storage and dispensing system that reduces the steps required to place puppy, doggy or training sheets on the floor.

It is an object to provide a storage system that reduces the space a plurality of stacked puppy pads consume. It is henceforth an object that the present system is capable of utilizing small and unique spaces in closets, utilities and other storage areas.

It is a benefit that the present storage and dispensing system is easy to use.

It is envisioned that the present storage system is an open frame body having a bottom wall and four sidewalls extending upwards therefrom. Anticipated as begin made of waterproof or waxed cardboard, the frame has one pair of sidewalls, opposite each other, terminating slightly before a centerline that runs across their length; hence, no sidewall extends upwards at a center portion of the bottom layer for two of the four edges. Alternatively, the system may comprise a bottom wall with only corner overhangs. A length of strip runs across the inside edge at a top of the remaining pair of sidewalls. In this manner, a stack of sheets can be laid across the interior portion of the frame body. Two perforated edges run across a length of the bottom wall where the sidewalls terminate. A third perforated edge runs across the centerline between the other two. The outer sidewalls of the frame are pulled upwards towards one another to fold the frame member closed. The sheet is rollably folded therein so that the storage system can stand upright in a closet space or on a retail shelf.

It is a final object of the present invention to provide benefits and advantages that accompany various features taught below.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
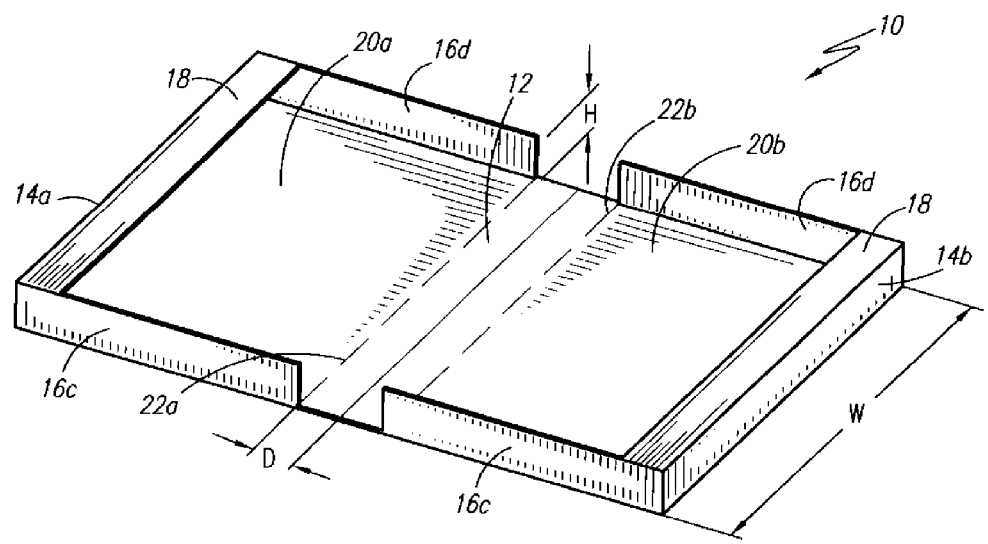
FIG. 1 is an elevational top view of a preferred embodiment of the present puppy pad storage system in accordance with the invention.

The best mode for carrying out the invention is presented in terms of its preferred embodiment, herein depicted within the Figures.

1. Detailed Description of the Figures

A pet pad storage and dispense system (hereinafter "storage system 10") is shown in the figures in accordance with a preferred embodiment of the present invention. The storage system 10 is constructed to store and to contain a plurality of stacked pet pads 30 (hereinafter synonymously referred to as "training pads", "puppy pads" and "doggy pads"). The pet pads are absorbent sheets that are layered in a stack. Soiled pads are disposed, so the absorbent sheets are pulled from the stack to replace the spent ones.

The present storage system 10 teaches a means to conserve space when storing the stacked sheets. The present storage system 10 is an open frame body having a bottom wall 12 and two pairs of sidewalls extending upwards therefrom. In its preferred embodiment the body is anticipated as being formed of a waterproof plastic or coated cardboard material. However, as would be obvious to one skilled in the relevant art, in light of the present teachings, any similar or equivalent material that avoids liquid absorption and provides a light weight, inexpensive and disposable body housing would be anticipated as being an equivalent replacement for purposes of the present teaching. To simplify the present teachings, the bottom wall 12 is described to have a first pair of sidewalls 14a, 14b along the bottom wall's length L and a second pair of sidewalls 16c, 16d (hereinafter synonymously referred to as "long walls") along the bottom wall's width W. The length L and the width W may be equal in measurement from end-to-end, but they are referred to herein by separate reference.

The first pair of sidewalls 14a, 14b travel along an entire width of the bottom wall's edge. The second pair of long walls 16c, 16d travel along the length L of the bottom wall 12 from the outer corners; however, the pair are both broken at their approximate mid-lengths. Each end of the pair of long walls 16c, 16d terminates slightly before a centerline C that runs across the bottom wall 12. The termination occurs opposite one another such that the pair of long walls 16c, 16d mirror. A distance D of their termination from the centerline C is at least a same or greater than a height H of each long wall; hence, no sidewall extends upwards across the approximate center portion of the bottom layer 12.

Figure 2:
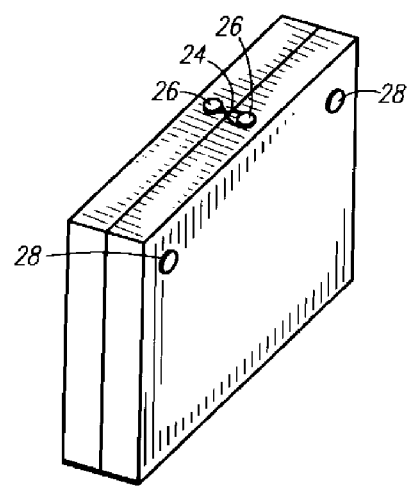
FIG. 2 is a side elevational view of the storage system in FIG. 1 in a closed position; and, FIG. 3 is an operational view of the storage system.

A length of strip 18 runs across the inside edge at a top of the first pair of sidewalls 14a, 14b. The inside long edges of the strips 18 are secured to the long, top edge of the first pair of sidewalls 14a, 14b. The short, tail-end edges of both strips 18 are secured at a top of the approximate distal ends of the long walls 16c, 16d. Henceforth, an open frame is formed having two mirrored portions 20a, 20b opposite the center line C. In this manner, a stack of sheets can be laid across the interior portion of the frame body. Two perforated edges 22a, 22b run across the length of the bottom wall where the long walls 16c, 16d terminate. All four outer sidewalls 14a, 14b, 16c, 16d of the frame are pulled upwards towards one another to fold the frame member closed (shown in FIG. 2). This is similar to closing a book, wherein the absorbent sheets are the sheets and the frame is the binding. Each sidewall and 14a, 14b, 16c, 16d and strip 18 closes to mate adjacent with its mirrored, opposite twin, wherein the stacked sheets are contained therein. The sheets can be contained therein by folds or by mechanical fasteners, such as, for example, staples, eyelets, and adhesives, etc.

To achieve the step of closing the storage system 10, the perforated edges 22a, 22b and the centerline C are capable of bending inwards. The sheets are rollably folded therein so that the storage system 10 can stand upright in a closet space and/or it can be slid between a nook formed between two other fixtures.

A means to secure the storage system 10 in a closed position is comprised at an outer wall portion of the first pair of sidewalls 14a, 14b. The means may comprise any known combination to securely close the two mirrored portions 20a, 20b, such as, for example, a string 24 affixed to a first in the pair of sidewalls 14a that wraps around wheels 26 affixed to both in the pair 14a, 14b, at least one buckle that extends from the first of the pair to snap-fit in a corresponding clasp on a second of the pair, etc.

It is anticipated that the present invention further comprises skid-proof padding 28 on the outside portion of the bottom wall 12. The padding 28 may comprise a plurality of spaced pads or a strip of pad(s) that run across the length of the wall. The padding is placed on the present storage system 10 to prevent scrapes to flooring when it is opened and laid across the floor. It will also prevent scrapes to doors, walls, fixtures and furniture it is tucked away against when it is concealed in the stored position.

It is finally envisioned that the present storage system may comprise artful and ornamental designs on its outer portion to make it an attractive display piece when the absorbent sheets are stored away.

The preferred dimensions the length L and the width W of the storage system 10 are both between 15-30 inches. The height H of the sidewalls 14a, 14b, 16c, 16d is preferably ½ inch, so the storage system 10 stands at 1×23×22 inches when it is closed so it can be tucked away. Each portion of the long walls is 11 inches, while the length of the long edges that doesn't have a wall extending therefrom is 1 inch. These measurements are not taught to limit the present embodiment; they are merely suggested for a storage system 10 that contains a stack of 23×23 inch sheets. Other measurements that better accommodate various sized absorbent sheets may be utilized with the present teachings.

2. Operation of the Preferred Embodiment

Figure 3:
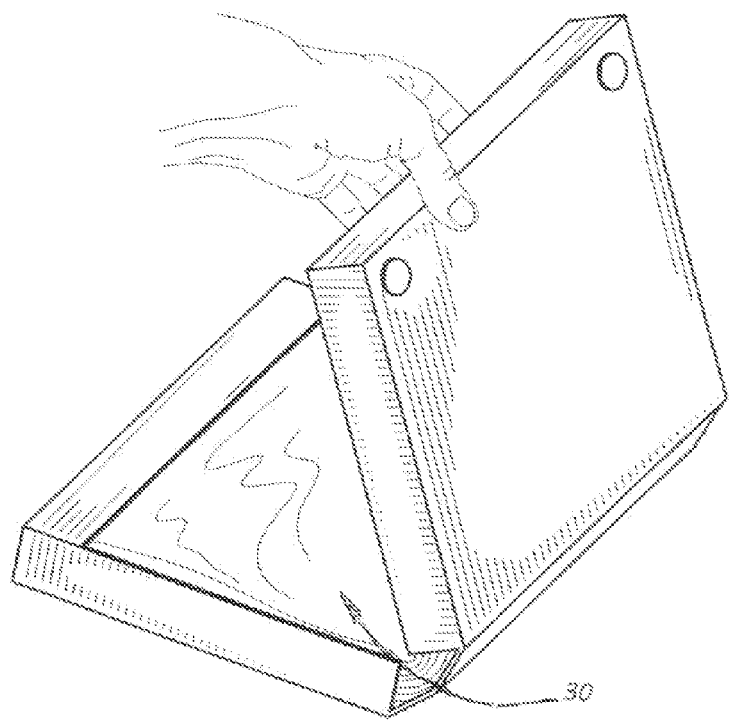

To use the present invention, it is pulled outwards from its stored, upright position. The means to secure the two portions is unattached so that either one or both of the mirrored portions fall to the ground. The sheets of absorbent pad 30 are stacked therein, so the first is pulled from the top. The storage system is closed by pulling or folding the mirrored sections towards each other, as shown in FIG. 3. The storage system is replaced upright and tucked away.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A method for storing a plurality of disposable, absorbent pet pads for a pet in need of training comprising:
   a. forming a waterproof or waxed cardboard frame having one pair of sidewalls, opposite each other, terminating slightly before a centerline that runs across their length such that no sidewall extends upwards at a center portion of the bottom layer for two of the four edges;
   b. loading within said frame a plurality of stacked and disposable, absorbent pet pads; and
   c. enclosing said pet pads within said frame.

2. A method of dispensing disposable, absorbent pet pads for a pet in need of training stored in the method of claim 1, comprising:
   a. pulling said frame outwards from its stored, upright position;
   b. opening said cardboard frame so that either one or both of the mirrored portions fall open onto a flat surface;
   c. exposing a top sheet;
wherein said exposed top sheet of absorbent pad are stacked therein is grasped and removed.

3. The method of claim 2, further comprising:
   d. closing by pulling or folding the mirrored sections towards each other, thereby adapting said frame to be replaced in an upright manner.

4. The method of claim 2, wherein said frame further comprises skid-proof padding on an outside portion of said bottom wall, and said padding is selected from a group comprising a plurality of spaced pads or a strip of pad(s) that run across the length of the wall.

5. The method of claim 1, wherein said frame, further comprises a means to secure said storage system in a closed position comprising an outer wall portion of said pair of sidewalls and an attachment mechanism affixed to a first in said pair of sidewalls that wraps around both in said pair of sidewalls.

* * * * *